United States Patent
Ghosh et al.

(10) Patent No.: US 9,373,979 B2
(45) Date of Patent: Jun. 21, 2016

(54) DIGITAL CONTROL METHOD FOR OPERATING UPS SYSTEMS IN PARALLEL

(71) Applicant: SCHNEIDER ELECTRIC IT CORPORATION, West Kingston, RI (US)

(72) Inventors: Rajesh Ghosh, Bangalore (IN); Mahima Agrawal, Bangalore (IN); Pradeep Tolakanahalli, Bangalore (IN); Damir Klikic, Waltham, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 519 days.

(21) Appl. No.: 14/047,109

(22) Filed: Oct. 7, 2013

(65) Prior Publication Data

US 2014/0103725 A1    Apr. 17, 2014

Related U.S. Application Data

(63) Continuation of application No. 12/780,349, filed on May 14, 2010, now Pat. No. 8,552,589.

(51) Int. Cl.
*H02J 7/00* (2006.01)
*H02J 9/00* (2006.01)
(Continued)

(52) U.S. Cl.
CPC ............. *H02J 9/061* (2013.01); *H02J 9/062* (2013.01); *H02M 7/493* (2013.01); *Y10T 307/615* (2015.04); *Y10T 307/625* (2015.04)

(58) Field of Classification Search
CPC ...... H02J 9/061; H02J 9/062; Y10T 307/615; Y10T 307/625
USPC ............................................. 307/64, 65, 66
See application file for complete search history.

(56) References Cited

U.S. PATENT DOCUMENTS 4,052,657 A    10/1977    Kleiner et al.
4,104,539 A    8/1978    Hase
(Continued)

FOREIGN PATENT DOCUMENTS

WO    2009044231 A2    4/2009

OTHER PUBLICATIONS

Chiang, S.J. et al., "Current limitation control for multi-module parallel operation of UPS inverters", IEE Proceedings: Electric Power Applications, Institution of Electrical Engineers, GB, vol. 151, No. 6, Aug. 26, 2004 (Aug. 6, 2004), pp. 752-757, XP006022900, ISSN: 1350-2352, DOI: 10.1049/IP-EPA: 20040683.
(Continued)

*Primary Examiner* — Carlos Amaya
(74) *Attorney, Agent, or Firm* — Lando & Anastasi, LLP

(57) ABSTRACT

Systems and methods of operating uninterruptible power supplies in parallel in a power distribution system to provide power to a load are provided. At least one uninterruptible power supply inverter provides power to the load. A communication interface provides a measured value of at least one of inverter output current of a first uninterruptible power supply and a measured value of the load current to a second uninterruptible power supply, and receives a measured value of at least one of inverter output current of the second uninterruptible power supply and the load current. A controller controls the uninterruptible power supplies to operate in one of a master state and a slave state. In the master state the uninterruptible power supply is configured to control the voltage to the load, and in the slave state the uninterruptible power supply is configured to determine a reference output current value based at least in part on at least one of the measured value of inverter output current of the second uninterruptible power supply and the measured value of the load current. The uninterruptible power supply in the slave state drives its inverter output current toward the reference output current value to provide its share of the load current.

20 Claims, 13 Drawing Sheets

(51) Int. Cl.
  *H02J 9/06*     (2006.01)
  *H02M 7/493*    (2007.01)

(56) References Cited

U.S. PATENT DOCUMENTS

| | | |
|---|---|---|
| 4,114,048 A | 9/1978 | Hull et al. |
| 4,673,825 A | 6/1987 | Raddi et al. |
| 4,684,872 A | 8/1987 | Stewart |
| 4,763,013 A | 8/1988 | Gvoth, Jr. et al. |
| 4,831,508 A | 5/1989 | Hunter |
| 5,017,800 A | 5/1991 | Divan |
| 5,081,367 A | 1/1992 | Smith et al. |
| 5,099,410 A | 3/1992 | Divan |
| 5,311,419 A | 5/1994 | Shires |
| 5,315,533 A | 5/1994 | Stich et al. |
| 5,319,571 A | 6/1994 | Langer et al. |
| 5,381,554 A | 1/1995 | Langer et al. |
| 5,543,667 A | 8/1996 | Shavit et al. |
| 5,646,459 A | 7/1997 | Hatate et al. |
| 5,901,057 A | 5/1999 | Brand et al. |
| 5,909,108 A | 6/1999 | He et al. |
| 6,191,500 B1 | 2/2001 | Toy |
| 6,274,950 B1 | 8/2001 | Gottlieb et al. |
| 6,285,178 B1 | 9/2001 | Ball et al. |
| 6,288,456 B1 | 9/2001 | Cratty |
| 6,292,379 B1 | 9/2001 | Edevold et al. |
| 6,295,215 B1 | 9/2001 | Faria et al. |
| 6,317,346 B1 | 11/2001 | Early |
| 6,330,176 B1 | 12/2001 | Thrap et al. |
| 6,356,470 B1 | 3/2002 | Sadler et al. |
| 6,400,043 B1 | 6/2002 | Batson et al. |
| 6,433,444 B1 | 8/2002 | de Vries |
| 6,455,954 B1 | 9/2002 | Dailey |
| 6,654,265 B2 | 11/2003 | Sadler et al. |
| 6,661,678 B2 | 12/2003 | Raddi et al. |
| 6,700,351 B2 | 3/2004 | Blair et al. |
| 6,721,672 B2 | 4/2004 | Spitaels et al. |
| 6,956,755 B2 | 10/2005 | Nielsen |
| 7,050,312 B2 | 5/2006 | Tracy et al. |
| 7,274,112 B2 | 9/2007 | Hjort et al. |
| 7,330,990 B2 | 2/2008 | Sato et al. |
| 7,425,779 B2 | 9/2008 | Luo et al. |
| 7,456,518 B2 | 11/2008 | Hjort et al. |
| 7,492,058 B2 | 2/2009 | Chen |
| 8,552,589 B2 | 10/2013 | Ghosh et al. |
| 2001/0003206 A1 | 6/2001 | Pole et al. |
| 2001/0005894 A1 | 6/2001 | Fukui |
| 2001/0033502 A1 | 10/2001 | Blair et al. |
| 2002/0130556 A1 | 9/2002 | Hohri |
| 2002/0162032 A1 | 10/2002 | Gundersen et al. |
| 2003/0034693 A1 | 2/2003 | Wareham et al. |
| 2003/0042794 A1 | 3/2003 | Jarrett |
| 2003/0048004 A1 | 3/2003 | Fleming et al. |
| 2003/0048647 A1 | 3/2003 | Sadler et al. |
| 2003/0142513 A1 | 7/2003 | Vinciarelli |
| 2003/0184160 A1 | 10/2003 | Yamamoto |
| 2005/0043859 A1 | 2/2005 | Tsai et al. |
| 2005/0071699 A1 | 3/2005 | Hammond et al. |
| 2005/0073783 A1 | 4/2005 | Luo et al. |
| 2005/0108582 A1 | 5/2005 | Fung |
| 2005/0201127 A1 | 9/2005 | Tracy et al. |
| 2006/0221523 A1 | 10/2006 | Colombi et al. |
| 2006/0279970 A1 | 12/2006 | Kernahan |
| 2006/0290205 A1 | 12/2006 | Heber et al. |
| 2007/0216229 A1 | 9/2007 | Johnson et al. |
| 2007/0228837 A1 | 10/2007 | Nielsen et al. |
| 2008/0067872 A1 | 3/2008 | Moth |
| 2008/0158917 A1 | 7/2008 | Chen |
| 2008/0197706 A1 | 8/2008 | Nielsen |
| 2008/0252145 A1 | 10/2008 | Urakabe et al. |
| 2008/0265680 A1 | 10/2008 | Marwali et al. |
| 2009/0039706 A1 | 2/2009 | Kotlyar et al. |

OTHER PUBLICATIONS

International Search Report for PCT/US2011/036186 mailed Jul. 10, 2012.

Strzelecki, R. et al., "Decentralized control of a UPS systems operating in parallel", Electronics. Conference, 2008. BEC 2008. 11th International Biennial Baltic, IEEE, Piscataway, NJ, USA, Oct. 6, 2008, pp. 297-300, XP031352717, ISBN: 978-1-4244-2059-9.

Tsai-Fu, Wu et al., "Current Weighting Distribution Control Strategy for Multi-Inverter Systems to Achieve Current. Sharing", IEEE Transactions on Power Electronics, IEEE Service Center, Piscataway, NJ, US, vol. 22, No. 1, Jan. 1, 2007, pp. 160-168, XP011154553, ISSN: 0885-8993, DOI: 10.1109/ TPEL.2006. 886622.

Wu, Tsai-Fu et al., "3C Strategy for Inverters in Parallel Operation Achieving an Equal Current Distribution", IEEE Transactions on Industrial Electronics, vol. 47, No. 2, Apr. 2000, pp. 273-281.

Chinese Search Report from corresponding Chinese Application No. 201110129586.8 issued on Jul. 25, 2014.

DIGITAL CONTROL METHOD FOR OPERATING UPS SYSTEMS IN PARALLEL

CROSS-REFERENCE TO RELATED APPLICATION

This application is a continuation of U.S. patent application Ser. No. 12/780,349 entitled "DIGITAL CONTROL METHOD FOR OPERATING THE UPS SYSTEMS IN PARALLEL," filed on May 14, 2010, which is herein incorporated by reference in its entirety.

BACKGROUND OF THE INVENTION

1. Field of Invention

At least one embodiment of the present invention relates generally to systems and methods of uninterruptible power supply control, and more specifically, to control of a plurality of uninterruptible power supply systems in a parallel configuration.

2. Discussion of Related Art

Uninterruptible power supplies are used to provide reliable power to many different types of electronic equipment. As power requirements increase, multiple uninterruptible power supplies collectively provide power to accommodate overall load requirements. Coordinating power distribution among uninterruptible power supplies is complex, unstable, and increases power distribution costs.

SUMMARY OF THE INVENTION

Systems and methods of uninterruptible power supply control are described herein. In at least one aspect, an uninterruptible power supply is configured in parallel with at least one other uninterruptible power supply in a master/slave relationship to provide power to a load. Output current of the uninterruptible power supply and its operating state as a master or a slave are determined and shared with the other uninterruptible power supplies. The uninterruptible power supply in the master state controls the load voltage, and the uninterruptible power supply in the slave state determines a reference output current value based at least in part on the actual output current of at least one other uninterruptible power supply. A controller adjusts a duty cycle of a control signal of the uninterruptible power supply to drive its output current toward the reference output current value. Uninterruptible power supplies in parallel configuration provide redundant power in N+1 or N+n operations to ensure redundancy, reliability, and power availability.

At least one aspect is directed to an uninterruptible power supply configured to operate in parallel with a second uninterruptible power supply in a power distribution system. The uninterruptible power supply includes an inverter and a communication interface. The inverter is configured to provide power to a load. The communication interface is configured to provide at least one of a measured value of a load current and a measured value of inverter output current of the uninterruptible power supply to the second uninterruptible power supply, and to receive at least one of the measured value of the load current and a measured value of inverter output current of the second uninterruptible power supply. The uninterruptible power supply also includes a controller coupled to the inverter and the communication interface. The controller is configured to control the uninterruptible power supply to operate in one of a master state and a slave state. In the master state the uninterruptible power supply is configured to control voltage to the load, and in the slave state the uninterruptible power supply is configured to determine a reference output current value based at least in part on at least one of the load current and the measured value of inverter output current of the second uninterruptible power supply and to drive inverter output current of the uninterruptible power supply toward the reference output current value.

At least one other aspect is directed to a method of distributing power using an uninterruptible power supply configured to operate in parallel with a second uninterruptible power supply to provide power to a load. The method includes an act of receiving at least one of a measured output current value of the second uninterruptible power supply and a measured load current value, and an act of determining a reference current value of the uninterruptible power supply based at least in part on at least one of the measured output current value of the second uninterruptible power supply and the measured load current value. The method also includes an act of controlling a duty cycle of a pulse width modulation control signal to drive an inverter output current of the uninterruptible power supply toward the reference current value.

At least one other aspect is directed to an uninterruptible power supply configured to operate in parallel with a second uninterruptible power supply to provide power to a load. The uninterruptible power supply includes an input configured to receive input power; and an output configured to provide output power derived from the input power. The uninterruptible power supply also includes means for receiving at least one of a measured load current value and a measured output current value of the second uninterruptible power supply and to determine a reference current value of the uninterruptible power supply based at least in part on at least one of the measured load current value and the measured output current value of the second uninterruptible power supply, and for driving an inverter output current of the uninterruptible power supply toward the reference current value.

In some embodiments, the uninterruptible power supply includes first and second current transformers. The first current transformer is configured to measure inverter output current of the uninterruptible power supply to determine the measured value of inverter output current, and to provide the measured value to the controller. The second current transformer is configured to measure the inverter output current of the uninterruptible power supply to determine the measured value of inverter output current, and to provide the measured value to the second uninterruptible power supply. The first and second current transformers can electrically isolate the uninterruptible power supply from the second uninterruptible power supply.

In one embodiment, the uninterruptible power supply is configured in one of a bypass mode and an inverter mode in the master state, and is configured in an inverter mode in the slave state. In one embodiment, the inverter output current is substantially equal to the measured value of the second inverter output current. The uninterruptible power supply can also be configured to supply power to the second uninterruptible power supply.

In one embodiment, the uninterruptible power supply includes a rectifier configured to supply a DC rectifier voltage to the inverter, and at least one controller configured to detect slave state operation of the uninterruptible power supply and to control the DC rectifier voltage at a threshold level above a DC reference rectifier voltage. The threshold level can be substantially 2 volts above the DC reference rectifier voltage. In some embodiments, the communication interface is configured to provide a measured value of load current to the second uninterruptible power supply, and the uninterruptible power supply is configured to determine the reference output current value based at least in part on the measured value of the load current.

In some embodiments, the uninterruptible power supply is configured in parallel with other uninterruptible power supplies and the reference current value of the uninterruptible power supply is determined based at least in part on a measured output current value of each of the other uninterruptible power supplies. In one embodiment, the output current value of the uninterruptible power supply and of each of the other uninterruptible power supplies in the parallel configuration is determined while maintaining electrical isolation between the uninterruptible power supply and of each of the other uninterruptible power supplies. The measured inverter output current value of the power supply can be communicated to the second uninterruptible power supply.

In one embodiment, the uninterruptible power supply is controlled in one of a master state and a slave state. In the master state the uninterruptible power supply is configured to control the voltage to the load, and in the slave state the uninterruptible power supply is configured to determine the reference output current value. The duty cycle of the pulse width modulation control signal can be controlled to drive the inverter output current of the uninterruptible power supply toward a value that is substantially equal to the measured output current value of the second uninterruptible power supply. In one embodiment, an inverter of the uninterruptible power supply is controlled to maintain a voltage of the load within a desired range. In some embodiments, a measured load current value can be received and the reference current value of the uninterruptible power supply can be determined based at least in part on the measured load current value. In one embodiment, means are provided for controlling the uninterruptible power supply at a no load condition.

Other aspects and, embodiments will become apparent from the following detailed description, taken in conjunction with the accompanying drawings, illustrating the principles of the invention by way of example. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
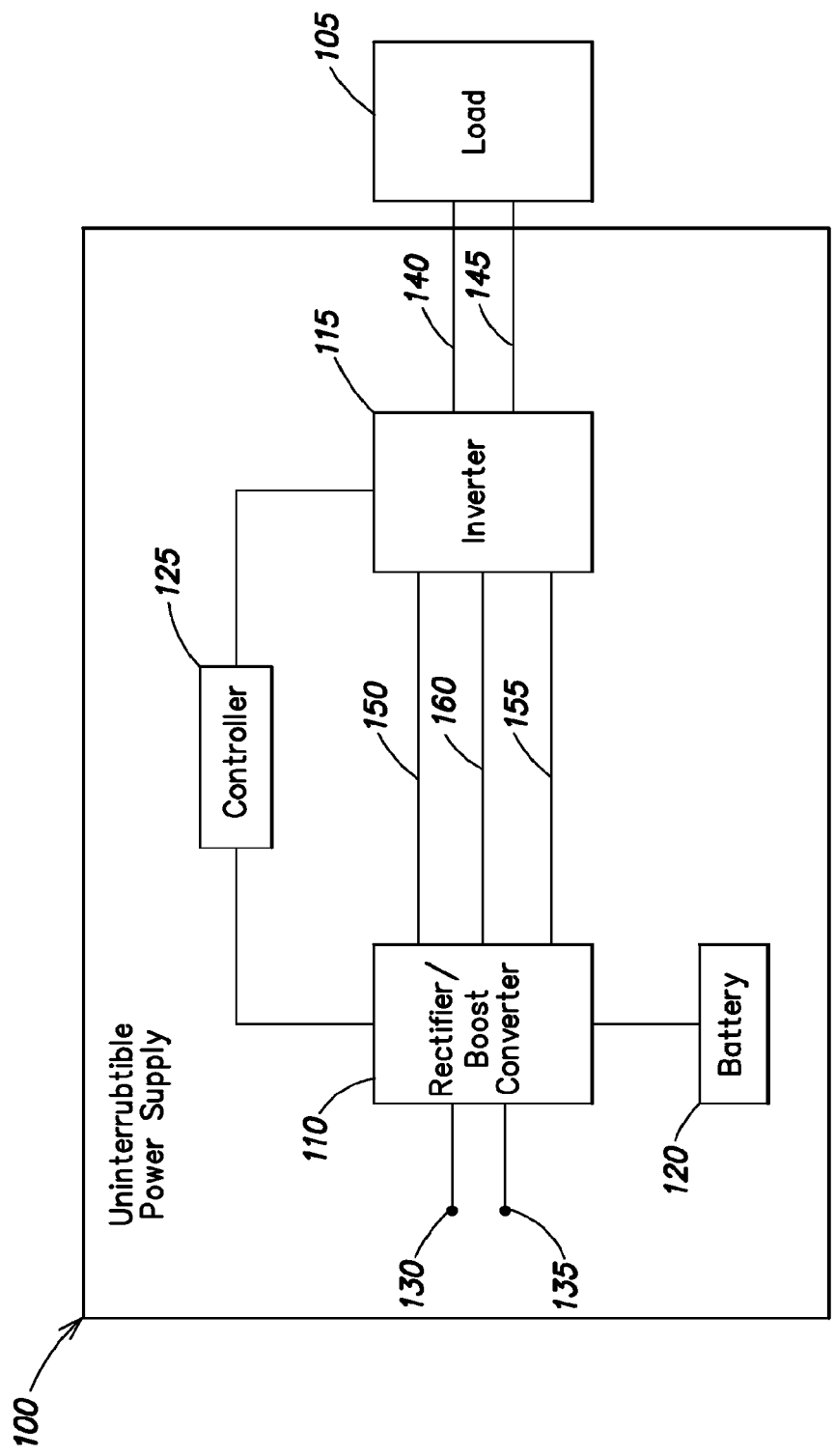
FIG. 1 is a block diagram of an uninterruptible power supply in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to a system and method for controlling uninterruptible power supplies that are connected in a parallel configuration to feed a common load bus. At least one of the plurality of uninterruptible power supplies is configured as a master, and at least one other uninterruptible power supply is configured as a slave, and these uninterruptible power supplies share load current information with each other. The master uninterruptible power supply is further configured as a voltage source to maintain the load voltage. The slave power supply is configured as a current source, and provides a proportional share of current to the load based at least in part on the shared load current information.

FIG. 1 is a functional block diagram of an uninterruptible power supply (UPS) 100 in accordance with an embodiment. In one embodiment, UPS 100 provides power to at least one load 105. UPS 100 may also include at least one input circuit 110, such as a rectifier, (e.g., a buck-boost converter circuit, which may also be referred to as a positive converter and a negative converter, unidirectional power converter, or universally as a boost converter circuit or simply boost converter) at least one inverter 115, at least one battery 120, and at least one controller 125. In one embodiment, UPS 100 includes AC input main lines 130 and 135 to couple respectively to line and neutral of an input AC power source. UPS 100 may also include outputs 140 and 145 to provide an output line and neutral to load 105.

In a line mode of UPS 100 operation, in one embodiment under the control of controller 125, input circuit 110 receives input AC voltage from inputs 130 and 135 and provides positive and negative output DC voltages at output lines 150 and 155 with respect to common line 160. In a battery mode of UPS 100 operation, for example upon loss of input AC power, input circuit 110 may generate DC voltages from battery 120. In this example, common line 160 may be coupled to input neutral line 135 and output neutral line 145 to provide a continuous neutral through UPS 100. Inverter 115, which may include a bidirectional power converter, receives DC voltages from input circuit 110 and provides output AC voltage at lines 140 and 145.

Figure 2A:
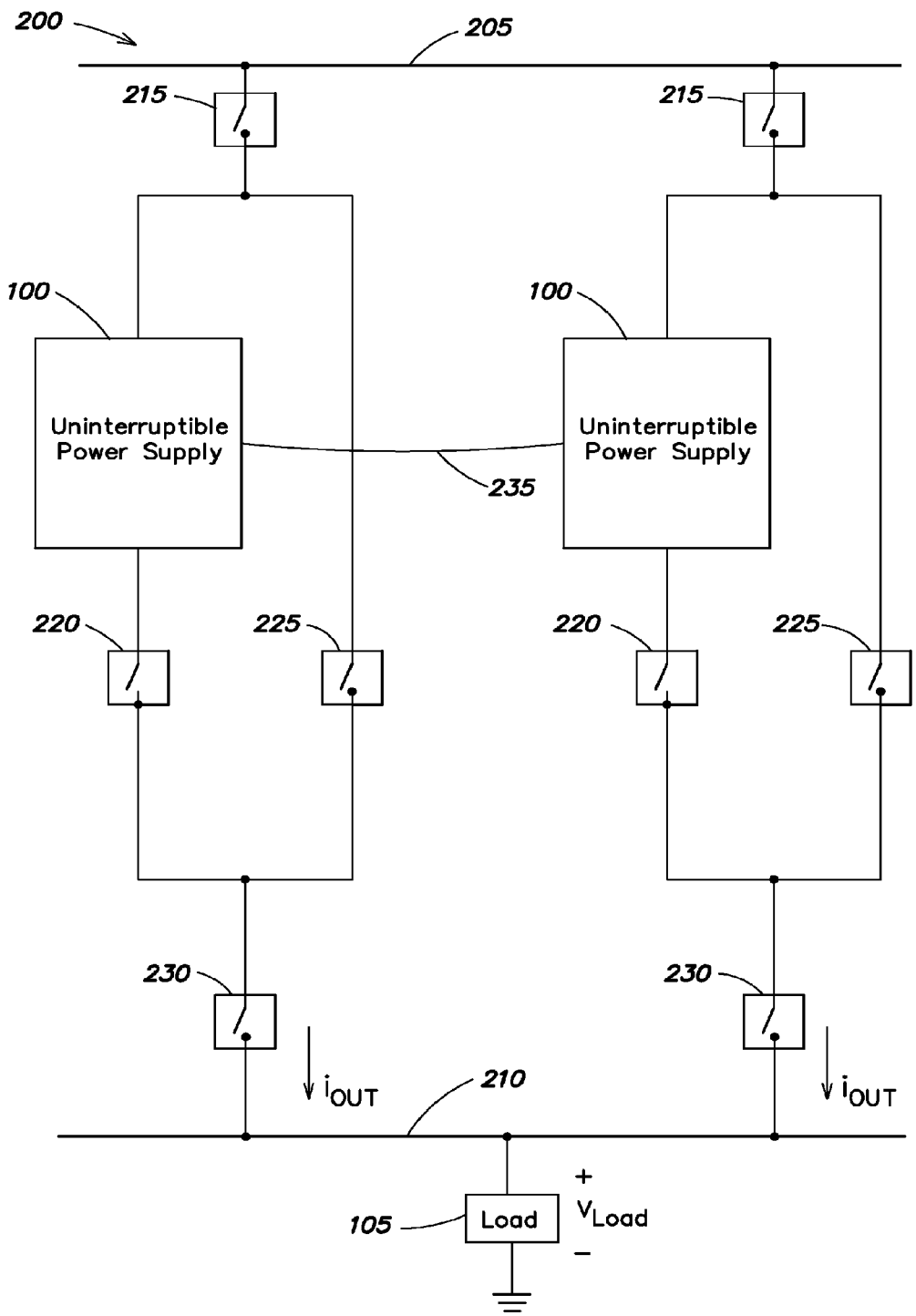
FIG. 2A is a block diagram of uninterruptible power supplies in a parallel configuration in accordance with an embodiment.

FIG. 2A is a functional block diagram of system 200 illustrating uninterruptible power supplies 100 in a parallel configuration to provide power to load 105. In one embodiment, a plurality of uninterruptible power supplies 100 are connected in parallel between an input phase of main bus line 205 and load bus line 210, as depicted in FIG. 2A. System 200 can also include a plurality of circuit breakers such as relays or switches, to configure uninterruptible power supply 100 in different states. For example, circuit breakers 215 connect main line 205 with uninterruptible power supplies 100. Inverter circuit breaker 220 connects uninterruptible power supply 100 with load 105. With reference to FIGS. 1 and 2, when circuit breaker 220 is in the ON or connected position, uninterruptible power supply 100 is operating in the inverter mode, where power is supplied to load 105 by inverter 115 in either the line or battery (or both) modes of operation. Bypass circuit breakers 225 can also connect main line 205 with load 105 in a bypass mode, where AC main line input voltage is provided to load 105, bypassing uninterruptible power supply 100. In one embodiment, the outputs of each uninterruptible power supply 100 are connected to load bus 210. In another embodiment, output circuit breakers 230 are configured between uninterruptible power supply 100 and load bus line 210 to control output current to load bus line 210. In one embodiment, providing power (e.g., voltage or current) to load 105 includes providing power to load bus line 210. For example, uninterruptible power supplies 100 can provide power to load bus line 210, and users may provide load 105 for connection with load bus line 210.

With reference to FIG. 2A, in one embodiment each uninterruptible power supply 100 can operate in either bypass mode with bypass circuit breakers 225 connecting main bus 205 with load 105, or in inverter mode with inverter circuit breakers 220 connecting uninterruptible power supply 100 with load 105, with each uninterruptible power supply 100 providing a substantially equal share of the load current to load 105. If, for example, one of the two uninterruptible power supplies 100 depicted in FIG. 2A fails, the other uninterruptible power supply 100 that remains functional can apply the full load current to load 105 when the load current is within the capacity of the functional uninterruptible power supply 100. In this example, the functioning uninterruptible power supply 100 can trip when the load current is beyond its capacity, breaking the connection with load 105.

In one embodiment, to provide power to load 105 via load bus line 210, uninterruptible power supply 100 can be configured in a master state or in a slave state with respect to at least one other uninterruptible power supply 100. For example, one uninterruptible power supply 100 controls the voltage of load 105 and can be the master power supply, with at least one other uninterruptible power supply 100 determined to be the slave power supply. The uninterruptible power supply 100 in the master state can control inverter 115 to maintain the voltage of load 105 at a desired level. In this example, at least one other uninterruptible power supply 100 in a slave state determines a reference current based at least in part on the inverter output current of another uninterruptible power supply 100, and controls its inverter 115 to drive its inverter current output toward the reference current. Thus, the master uninterruptible power supply 100 can control its inverter output voltage to regulate the load voltage, and the slave uninterruptible power supply 100 can control its inverter output current to provide a share of the load current.

In one embodiment, system 200 includes a first uninterruptible power supply 100 in a master state, and a second uninterruptible power supply 100 in a slave state. For example, in system 200 with two uninterruptible power supplies 100 configured in parallel with load 105, a first uninterruptible power supply 100 can operate in a bypass mode, with power supplied to load 105 via main lines 205, bypassing inverter 115, and a second uninterruptible power supply 100 can operate in an inverter mode, with power supplied to load 105 by inverter 115. In this embodiment, load 105 is configured in parallel with main lines 205 due to the bypass operation, causing the load voltage to be substantially the same as the main line voltage. Controller 125 of the first uninterruptible power supply can determine that the first uninterruptible power supply 100 (in bypass mode) is in the master state, and the second uninterruptible power supply 100 (in inverter mode) is in the slave state. In this example, as there are two uninterruptible power supplies configured in parallel with load 105, the second (slave) uninterruptible power supply 100 is controlled to provide inverter output current to load 105, and the remaining load current is provided, in this example, from main lines 205 through the first (master) uninterruptible power supply 100.

While two uninterruptible power supplies 100 are illustrated in parallel in FIG. 2A, it is appreciated that system 200 is scalable and modular, and that any number of power supplies 100 can be configured in parallel. Further, each uninterruptible power supply 100 may operate in either the master state or the slave state, and uninterruptible power supplies 100 can switch between master states and slave states. There can also be more than one uninterruptible power supply 100 in the master state or in the slave state. In some embodiments, system 200 includes a plurality of uninterruptible power supplies 100 with multiple uninterruptible power supplies 100 configured in the master state at the same time, with different uninterruptible power supplies 100 in the master state at different times, or with any number of uninterruptible power supplies in the slave state, simultaneously or at different times. In some embodiments, at least one uninterruptible power supply 100 in the master state is configured in parallel with at least one uninterruptible power supply 100 in the slave state.

System 200 also includes at least one communication cable 235 connected to each of the uninterruptible power supplies 100 to exchange information between them (e.g., between their respective controllers 125). For example, communication cable 235 can connect to general purpose input/output (GPIO) connections at communication interfaces of uninterruptible power supplies 100 and can communicate information via a controller area network (CAN), using controller area network protocols. Other communication systems may also be used, such as those compliant with the Recommended Standard 232 (RS-232 or EIA 422), Recommended Standard 485 (RS-485 or EIA-485) or other American National Standards Institute (ANSI), Telecommunications Industry Association (TIA), or Electronic Industries Alliance (EIA) telecommunications standards for data transmission.

In one embodiment, the information communicated through the communication cable 235 includes status or operational information of uninterruptible power supplies 100. For example, communication cable 235 can communicate information indicating: 1) whether an uninterruptible power supply is in the master state or the slave state; 2) the input phase of main line 205 to which it is connected; and 3) a measured value of its output current, e.g., a measured value of inverter 115 output current. In one embodiment, at least some of this information is provided in digital signals that are electrically isolated using opto-isolators or opto-couplers before being sent between uninterruptible power supplies 100.

Figure 2B:
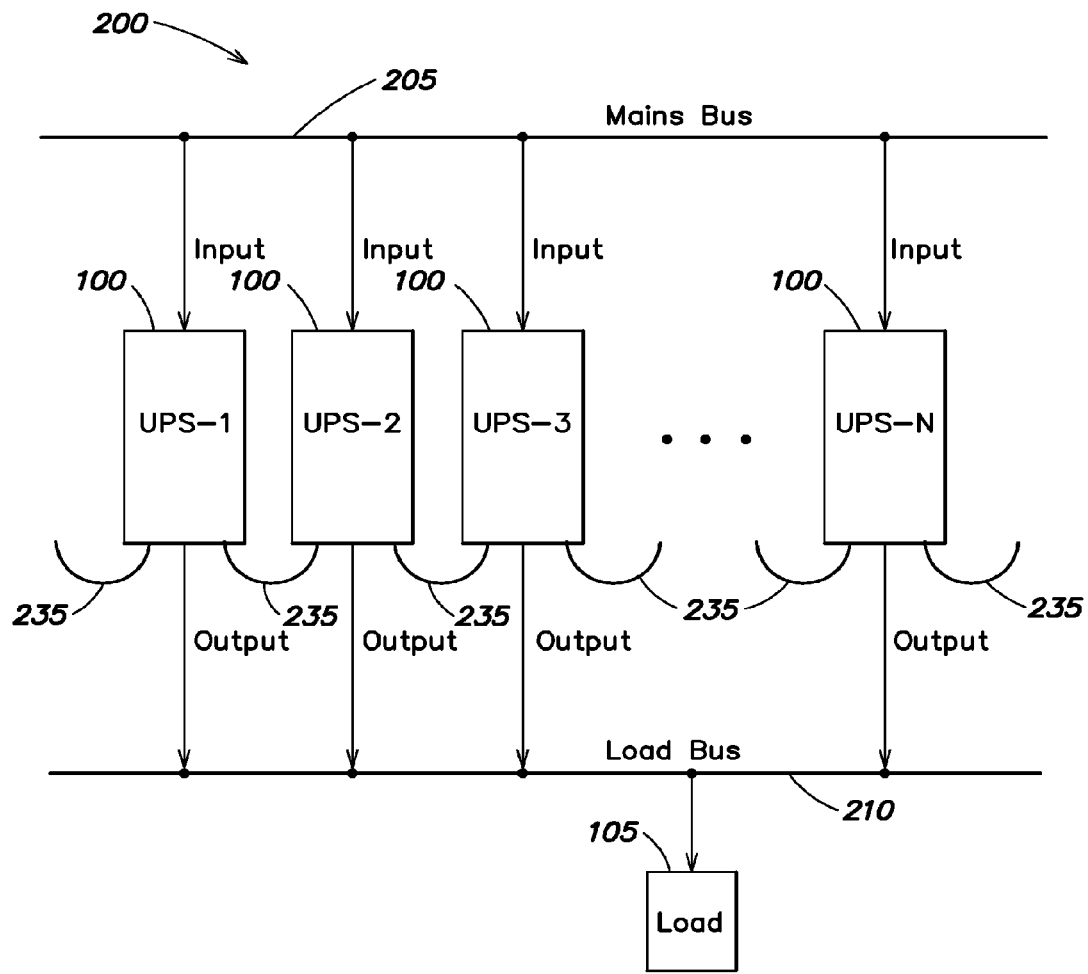
FIG. 2B is a block diagram of uninterruptible power supplies in a parallel configuration in accordance with an embodiment.
Figure 2C:
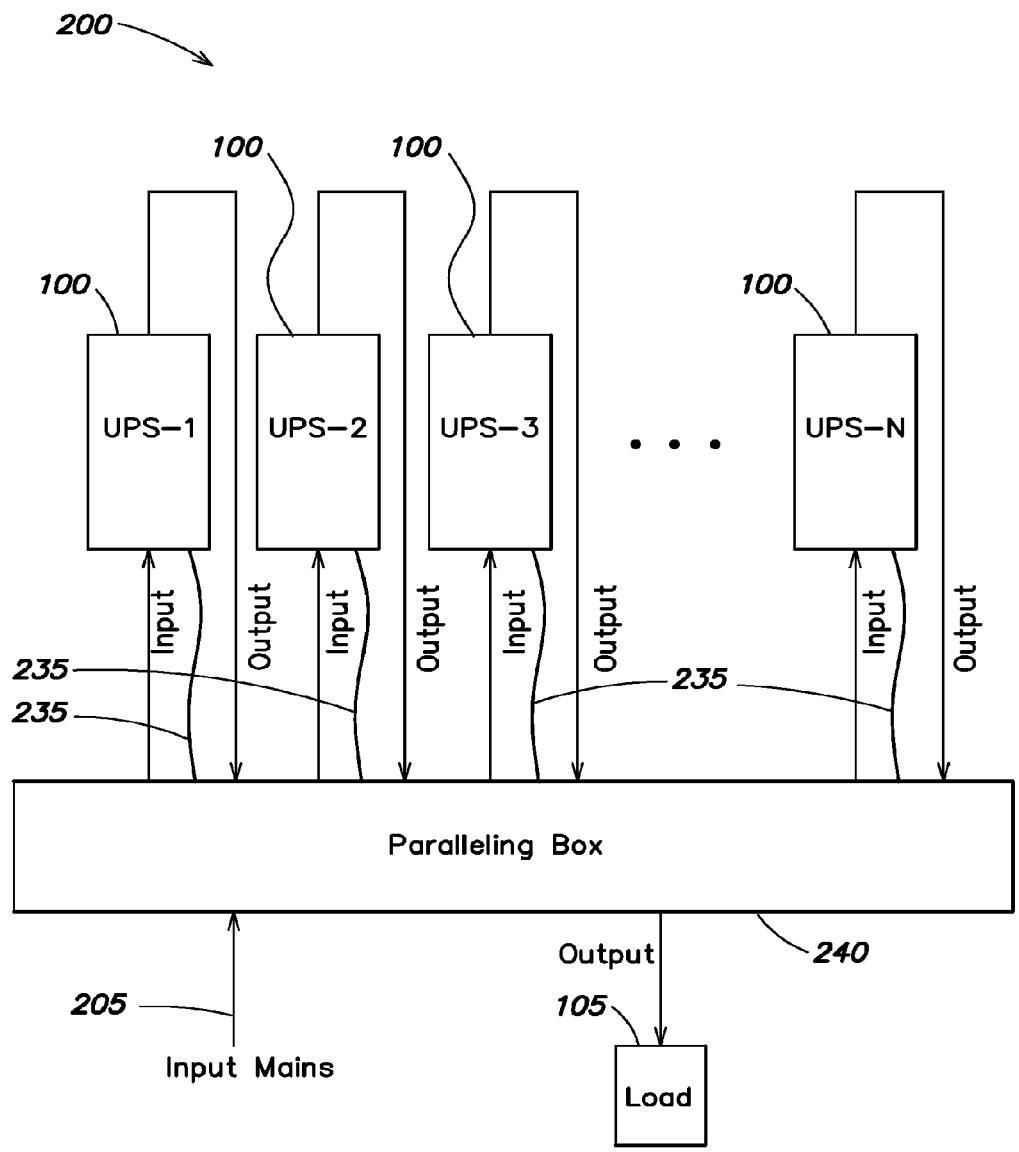
FIG. 2C is a block diagram of uninterruptible power supplies in a parallel configuration in accordance with an embodiment.

In some embodiments, a plurality of uninterruptible power supplies 100 are configured in parallel to supply power directly to load bus 210, as illustrated in FIG. 2B, or to supply power through a paralleling box 240, as illustrated in FIG. 2C. Paralleling box 240 may assist in organization, maintenance, and installation of uninterruptible power supplies 100. With reference to FIGS. 2B and 2C, the inputs include power input from main lines 205 to uninterruptible power supply 100, and outputs include power supplied from uninterruptible power supply 100 to load bus line 210.

Figure 3:
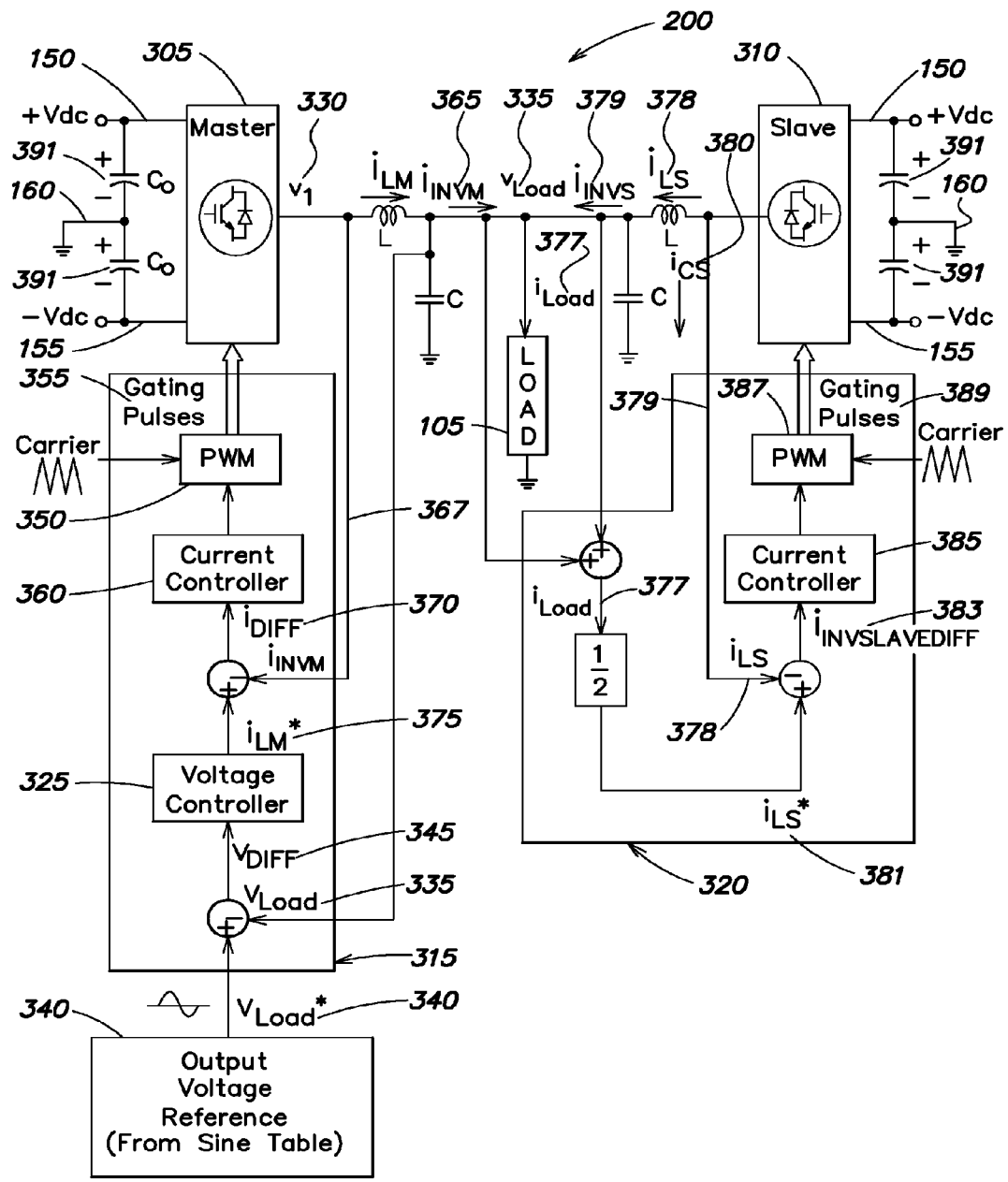
FIG. 3 is a schematic diagram of power supply inverters in a parallel configuration in accordance with an embodiment.

FIG. 3 is a schematic diagram of system 200 with uninterruptible power supply inverters in a parallel configuration with respect to load 105. As illustrated in FIG. 3, inverter 305 is configured to operate in a master state and inverter 310 is configured to operate in a slave state. Master controller 315 controls the output voltage and current of master inverter 305, and slave controller 320 controls the output current of slave inverter 310. With reference to FIGS. 1 and 3, inverter 115 of uninterruptible power supply 100 can be configured to operate as master inverter 305 and as slave inverter 310, and can switch between these operating states. Further, controller 125 can include the control logic of master controller 315 and slave controller 320, and can process information in analog, digital, and hybrid domains.

In one embodiment, inverter output voltage 330 of master inverter 305 is applied to load 105 as load voltage 335. Master controller 315 may include voltage controller 325 to regulate load voltage 335. For example, the value of load voltage 335 is compared with reference load voltage 340 to identify the voltage error represented by differential load voltage 345. In this example, voltage controller 325 and pulse width modulator 350 adjust the width of gating pulses 355 based at least in part on differential voltage 345 to drive load voltage 335 toward reference load voltage 340, providing regulated voltage control of load voltage 335. More specifically, voltage controller 325 can process differential voltage 345 to generate master inductor reference current 375, which is the desired master inverter current 365 to maintain load voltage 335 at a given level. The master inductor reference current 375 is compared with master inverter inductor current 367 to identify differential master inverter current 370 and provided to current controller 360. Continuing with this example, current controller 360 adjusts the width of gating pulses 355 based on differential master inverter current 370 to drive master inverter current 365 toward master inductor reference current 375. In one embodiment, master controller 315 is a digital controller and load voltage 335 is sent to master controller 315 through an analog-digital converter (ADC).

In one embodiment, slave inverter 310 is controlled to regulate slave inverter current 379 to provide a proportional share of load current 377 to load 105. In one embodiment, master inverter current 365 is measured by, for example, a current transformer, and this measured value is provided to slave controller 320. Slave controller 320 can determine slave reference current 381 based at least in part on the measured value of master inverter current 365. For example, and as illustrated in FIG. 3, slave controller 320 can sum master inverter current 365 with slave inverter current 379 and divide by the number of uninterruptible power supplies 100 operating in parallel configuration with respect to load 105 to identify slave reference current 381, which is compared with slave inverter inductor current 378 to determine differential slave inverter current 383. Based at least in part on differential slave inverter current 383, current controller 385 and pulse width modulator 387 can adjust the width of gating pulses 389 to drive slave inverter current 379 toward slave reference current 381. Load current 377 can also be measured and this measured value can be provided to slave controller 320, which determines slave reference current 381 based at least in part on at least one of the measured value of load current 377 and the measured value of master inverter current 365. As illustrated in FIG. 3, slave capacitor current 380 does not substantially effect the determination, by slave controller 320, of slave reference current 381. As discussed further below with reference to FIG. 5, in one embodiment, slave controller 320 does determine the value of slave reference current 381 based at least in part on slave capacitor current 380.

As discussed above with reference to FIG. 2C, uninterruptible power supplies 100 can be connected in parallel using paralleling box 240. In one embodiment, paralleling box 240 includes at least one current transformer for each uninterruptible power supply 100. The current transformers measure uninterruptible power supply output current. This measured value of the inverter current is provided to the other uninterruptible power supplies 100. For example, the current transformers can measure the inverter current of uninterruptible power supply 100 and provide this measured value to another uninterruptible power supply 100. In one embodiment, a current transformer measures master inverter current 365 of a first (master) uninterruptible power supply 100 and this measured value is provided to a second (slave) uninterruptible power supply, where slave controller 320 processes this information to identify slave reference current 381. For example, master inverter current 365 or slave inverter current 379 may be passed through the primary winding of a current transformer that has two identical secondary windings. In this example, the output of the first secondary winding of current transformer may be used for control purposes of one uninterruptible power supply 100, and the output of the second secondary winding may be used for control purposes of another uninterruptible power supply 100.

In one embodiment, a dedicated current transformer determines the inverter output current of each uninterruptible power supply 100, and this measured value is communicated to other uninterruptible power supplies via a communication cable 235. This provides electrical isolation between the communication signals that pass between uninterruptible power supplies 100. In some embodiments, a single current transformer can measure the value of inverter current output from at least one uninterruptible power supply 100 when, for example, electrical isolation is not a design characteristic. Without paralleling box 240, the current transformers can be part of uninterruptible power supplies 100. In one embodiment, the current transformers are separate units external to uninterruptible power supplies 100 that communicate with uninterruptible power supplies 100 via communication cables.

Although not illustrated in FIG. 3, master inverter 305 can include slave state control logic and slave inverter 310 can include master state control logic, and that each inverter can be configured to operate as either a master or a slave. With regard to FIGS. 1 and 3, master controller 315 and slave controller 320 can be part of the same control unit, such as controller 125 and can be part of uninterruptible power supply 100 or separate units. A single master controller 315 or slave controller 320 can be configured to control one or more than one uninterruptible power supplies 100.

In one embodiment, controller 125 controls reverse power flow that may occur between uninterruptible power supplies 100 that are configured in parallel. For example, load 105 may be active or regenerative so that energy is fed back to inverters 115. When, for example, converter 110 is a unidirectional power converter, the reverse power is not absorbed, and DC bus voltages at output lines 150 and 155 can increase to a trip level.

The plurality of uninterruptible power supplies 100 may operate at least temporarily at no load conditions, where master inverter current 365 is equal to the negative of slave inverter output current 379, as in equation (1) below.

$$i_{INVMaster} = -i_{INVSlave} \quad (1)$$

During no load operation, load voltage 335 may include a DC offset voltage $V_{OFFSET}$ and a DC offset current $i_{OFFSET}$ may be present in slave inverter current 379 due to voltage and current measurement tolerances. These offsets cause power flow, (e.g., an exchange in active and reactive power) between master inverter 305 and slave inverter 310. This can increase DC voltages at output lines 150 and 155 to undesirable levels, tripping uninterruptible power supply 100. The time it takes for the DC voltages at output lines 150 and 155 to increase to a tripping level can vary based on the characteristics of capacitors 391.

In one embodiment, control of load voltage 335 by an uninterruptible power supply 100 acting as a master includes control of $V_{OFFSET}$ present in load voltage 335. As will now be described with reference to FIG. 4, the load voltage 335 is passed through lowpass filter 405, which filters AC voltage components from load voltage 335 and outputs the DC voltage component of load voltage 335. Lowpass filter 405 may have, for example, a cutoff frequency of 0.5 Hz or less. Load voltage 335 is then processed by voltage offset controller 410, which adjusts the DC level of load reference voltage 340 to drive $V_{OFFSET}$ of load voltage 335 toward zero. In one embodiment, voltage controller 410 includes an integral (I type) controller. Voltage controller 410 may also include a proportional-integral (PI type) or proportional-integral-derivative (PID type) controller.

Offset error and other offsets in the measurement of load voltage 335 may not be completely eliminated by lowpass filter 405 and voltage offset controller 410, and a parallel uninterruptible power supply 100 operating in slave mode controls current offset that may be present in slave inverter current 379 at, for example no load or light (e.g., <1%) load conditions.

The current offset can increase DC voltages at output lines 150 and 155, which with reference to FIG. 1 is the output voltage of rectifier 110. In one embodiment, controller 125 of an uninterruptible power supply in slave mode controls this rectifier output voltage by driving it toward a DC reference voltage $V_{DC}^*$. At minimal or no load slave inverter 310 can feed active power to master inverter 305, and voltage can accumulate at lines 150 and 155 of master inverter 305. To detect this reverse power flow a threshold voltage ($V_{THRESH}$) above reference voltage is applied to output lines 150 and 155 that feed slave inverter 310 so that the voltage at output lines 150 and 155 of slave inverter 310 is $V_{DC}^*+V_{THRESH}$. Because $V_{THRESH}$ in one embodiment is not applied to output lines 150 and 155 that feed master inverter 305, it remains regulated around reference voltage $V_{DC}^*$. This disables the rectifier of uninterruptible power supply 100 that is associated with slave inverter 310 so that the rectifier does not feed power to lines 150 and 155 of slave inverter 310, which in turn do not feed power to slave inverter 310. In one embodiment, $V_{THRESH}$ is 2V, although this may vary.

Figures 5A, 5B:
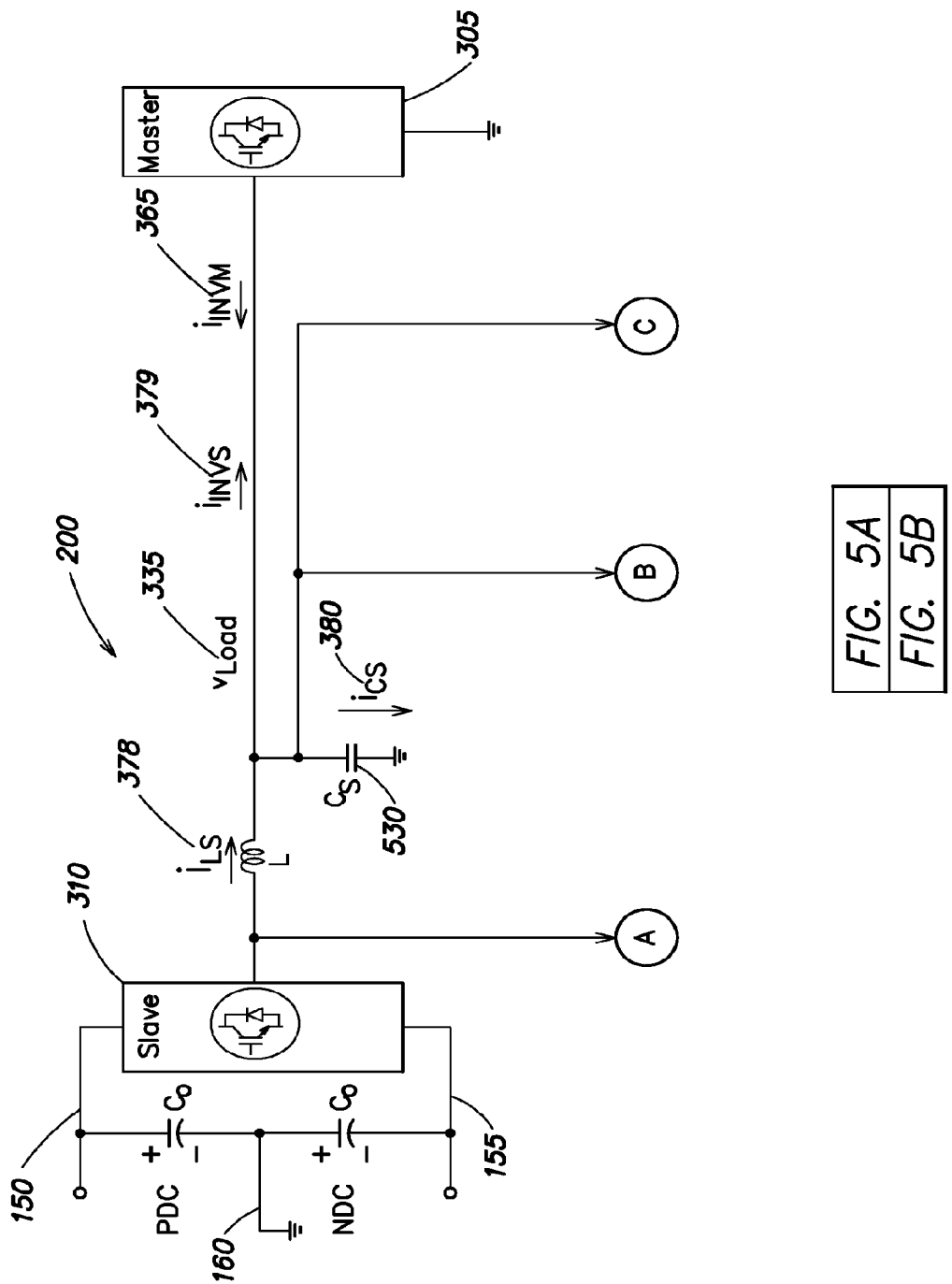
FIGS. 5A and 5B illustrate a schematic diagram of power supply inverters in a parallel configuration in accordance with an embodiment.
Figure 5B:
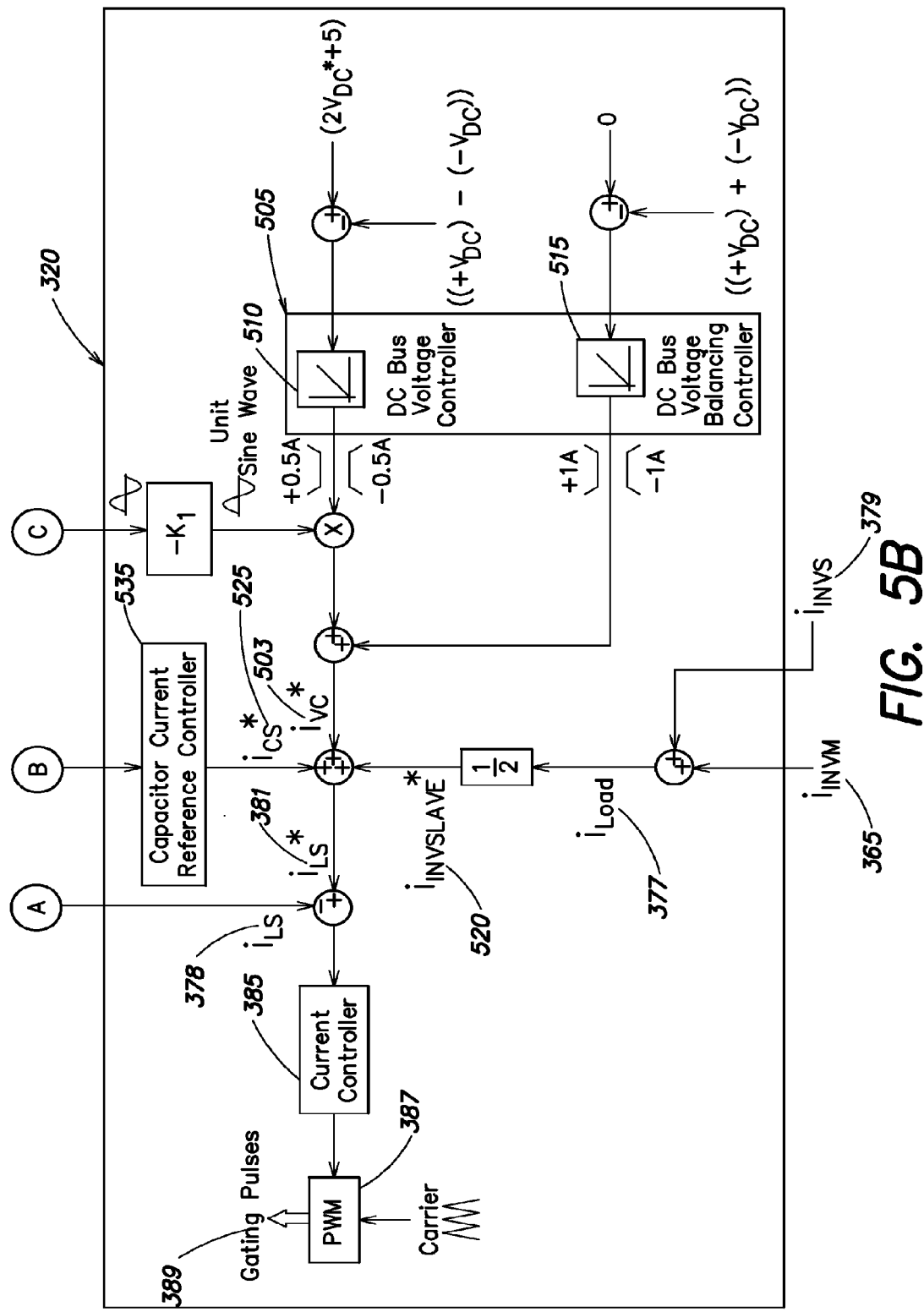

To maintain output lines 150 and 155 of slave inverter 310 at $V_{DC}^*+V_{THRESH}$, and to prevent voltage increases at lines 150 and 155 of master inverter 305, slave inverter 310 draws active power from master inverter 305. For example, as illustrated in FIG. 5, DC voltage controller 505 controls and balances the two DC bus voltages at output lines 150 and 155 of slave inverter 310 to determine compensating reference voltage control current 503 ($i_{VC}^*$). DC voltage controller 505 includes two controllers, DC bus voltage controller 510 to control the entire DC bus voltage, e.g., $+V_{DC}$ output line 150 and $-V_{DC}$ output line 155 (($+V_{DC}$)-($-V_{DC}$)), and DC balancing controller 515 to balance $+V_{DC}$ output line 150 and $-V_{DC}$ output line 155 (($+V_{DC}$)+($-V_{DC}$)). In one embodiment, DC voltage controller 505 (including DC bus voltage controller 510 and DC balancing controller 515) is an I-type controller. However, DC voltage controller 505 may also include PI and PID-type controllers.

As depicted in FIG. 5, in one embodiment, DC bus voltage controller 510 adjusts the amplitude of reference voltage control current 503, which is for example 180 degrees out of phase with load voltage 335, to draw power from master inverter 305 to slave inverter 310. In one embodiment, reference voltage control current 503 is clamped to a tolerance range such as for example +/−0.5 A. For example, when load voltage 335 is 230V, slave inverter 310 can source or sink active power of approximately 80 W, e.g., (230(0.5))/√2).

In one embodiment, DC balancing controller 515 controls slave inverter current 379 by adjusting the DC level of reference voltage control current 503 ($i_{VC}^*$) to balance positive ($+V_{DC}$) output line 150 with negative ($-V_{DC}$) output line 155. For example, with respect to neutral line 160, positive output line 150 may be less then negative output line 155 in absolute terms. In this example, DC balancing controller 515 adds positive offset to reference voltage control current 503 to charge positive output line 150 for a time period longer than the time period to charge negative output line 155.

In one embodiment, DC voltage controller 505 regulates rectifier/boost converter 110 output voltage of lines 150 and 155 when the associated uninterruptible power supply is in the slave state. For example, if slave inverter 310 draws power from master inverter 305, the (slave) voltage of lines 150 and 155 can increase toward, and if left uncontrolled, beyond $V_{DC}^*+V_{THRESH}$. In another example, if slave inverter 310 feeds power to master inverter 305, the (slave) voltage of lines 150 and 155 can decrease below $V_{DC}^*+V_{THRESH}$. In both of these examples, DC bus voltage controller 510 of slave uninterruptible power supply 100 can adjust reference voltage control current 503 ($i_{VC}^*$) to maintain the voltage of lines 150 and 155 to substantially $V_{DC}^*+V_{THRESH}$.

In some embodiments, DC voltage controller 505 regulates positive and negative DC offsets that may be present in slave inverter output current 379. For example, slave inverter current 379 may contain a positive DC offset, where positive ($+V_{DC}$) output line 150 discharges more than negative ($-V_{DC}$) output line 155, or a negative DC offset, where negative ($-V_{DC}$) output line 155 discharges more than positive ($+V_{DC}$) output line 150. In both of these examples, DC balancing controller 515 can adjust the offset level in reference voltage control current 503 to compensate for the positive or negative offsets.

In one embodiment, when a load is configured in parallel with inverters 305 and 310, slave reference current 381 ($i_{LS}^*$) becomes nonzero and the effective power component of the current reference is ($i_{LS}^*+i_{VC}^*$). In this embodiment, reference voltage control current 503 may be, for example, 180 degrees out of phase with slave reference current 381, and the effect of reference capacitor current 525 ($i_{CS}{}^*$) may be ignored.

At light load, (e.g., less than 160 W), reference voltage control current 503 ($i_{VC}{}^*$) can dominate over slave inverter current 379, and the net power to slave inverter 310 can become negative. In this example, master inverter 305 may supply the entire load power, and in addition may also supply DC bus charging power to slave inverter 310 to maintain slave lines 150 and 155 at $V_{DC}\,V_{THRESH}$ as discussed above, where $V_{THRESH}$ is, for example, substantially 2V.

In another example, at heavier load, (e.g., more than 160 W), DC bus voltage controller 510 may saturate to its maximum saturation value, (for example +0.5 A), causing reference voltage control current 503 to be, in this example, a sine wave of constant amplitude 0.5. In this example, reference inverter current 520 dominates over reference voltage control current 503 and the net power out of slave inverter 310 is positive so that slave inverter 310 feeds power to load 105. Slave inverter DC bus lines 150 and 155 can discharge to a value less than $V_{DC}{}^*+V_{THRESH}$, with the rectifier associated with slave inverter 310 (e.g., rectifier 110) feeding slave inverter DC bus lines 150 and 155 to maintain them at approximately $V_{DC}{}^*$. Disabling the output of DC bus voltage controller 510, for example at higher loads, can prevent power shared by slave inverter 310 from being, less than the power shared by master inverter 305.

Figure 4:
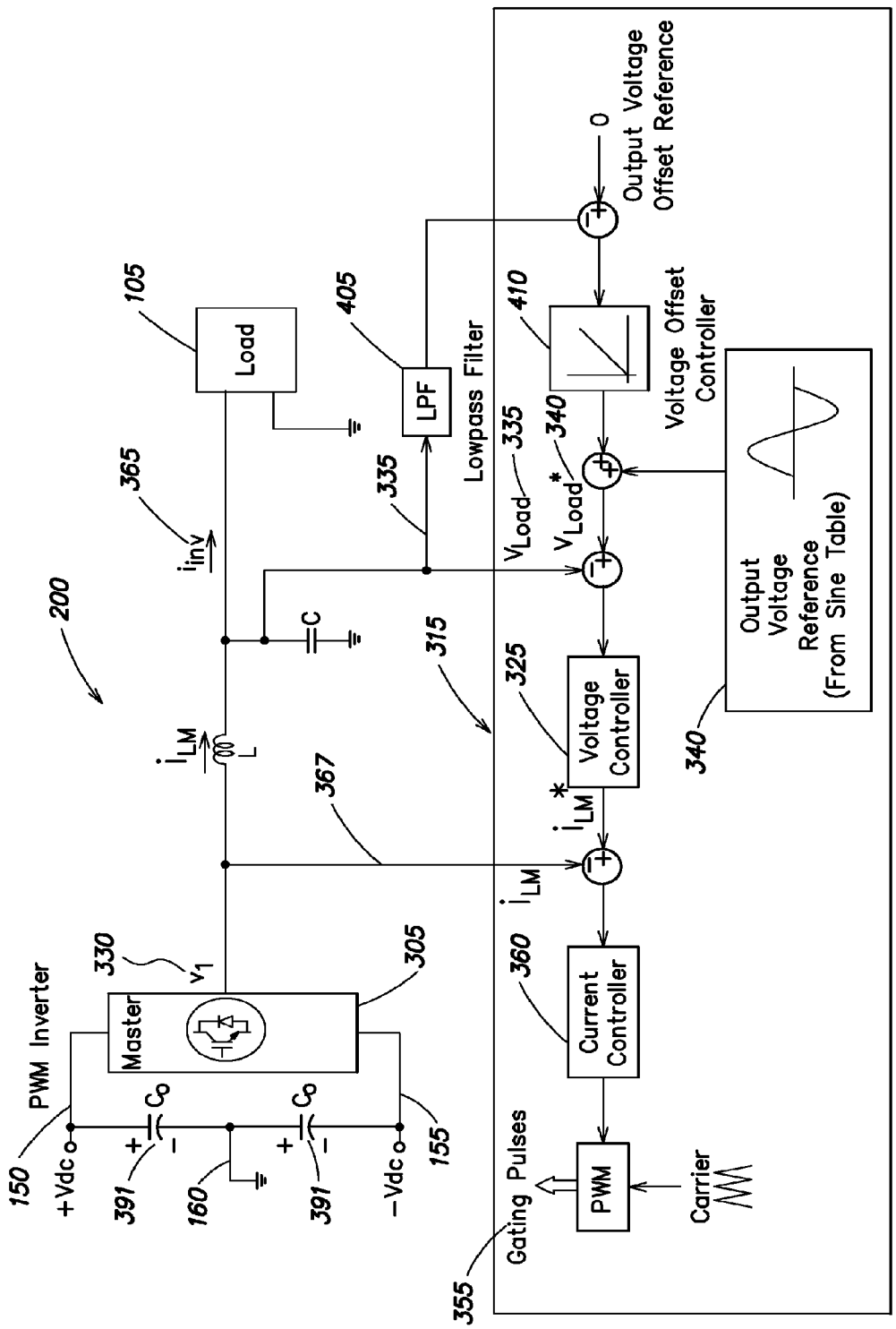
FIG. 4 is schematic diagram of a power supply inverter with offset correction control in accordance with an embodiment.

With reference to FIGS. 3-5, in one embodiment slave inverter inductor current 378 ($i_{LS}$) is provided in equation (2), where $i_{INVS}$ is slave inverter current 379 and ($i_{CS}$) is slave capacitor current 380; the corresponding slave reference current 381 ($i_{LS}{}^*$) is provided in equation (3), where $i_{INVS}{}^*$ is reference inverter current 520 and $i_{CS}{}^*$ is reference capacitor current 525; slave capacitor current 380 ($i_{CS}$) is provided in equation (4); where $V_m$ is the amplitude of load voltage 335 ($V_{LOAD}$), ω is the angular frequency, and $C_S$ is capacitance of capacitor 530; and load voltage 335 ($V_{LOAD}$) is provided in equation (5).

$$i_{LS}=i_{INVS}+i_{CS} \quad (2)$$

$$i_{LS}{}^*=i_{INVS}{}^*+i_{CS}{}^* \quad (3)$$

$$i_{CS}=(V_m\omega C_S)\cos \omega t \quad (4)$$

$$V_{LOAD}=V_m \sin \omega t \quad (5)$$

In one embodiment, slave reference current 381 ($i_{LS}{}^*$) is also provided in equation (6), where $i_{LOAD}$ is load current 377, $i_{CS}{}^*$ is reference capacitor current 525, and $UPS_H$ is the number of healthy (e.g., normally operating) uninterruptible power supplies 100 that are connected in parallel. $UPS_H$ may ignore uninterruptible power supplies 100 in the OFF state and may include uninterruptible power supplies 100 in the bypass mode.

$$i_{LS}^* = \left(\frac{i_{LOAD}}{UPS_H}\right) + i_{CS}^* \quad (6)$$

In one embodiment, capacitor current reference controller 535 determines reference capacitor current 525 based at least in part on a measured output voltage of inverter 310, the value of capacitor 530, and a look up table. It is appreciated that the same or a different look up table may also be used to determine reference load voltage 340.

As noted above with reference to FIG. 3, in one embodiment slave controller 320 does not determine reference capacitor current 525. For example, slave controller 320 need not include capacitor current reference control logic such as capacitor current reference controller 535. In this example without capacitor current reference control, master inverter 305 may provide slave capacitor current 380 ($i_{CS}$) to slave inverter 310 for charging capacitor 530. In this example, master inverter current 365 ($i_{INVM}$) and slave inverter current 379 ($i_{INVS}$) are provided in equations (7) and (8) respectively, with their difference provided in equation (9), where $i_{LOAD}$ is load current 377.

$$i_{INVM} = \left(\frac{i_{LOAD}}{2}\right) + i_{CS} \quad (7)$$

$$i_{INVS} = \left(\frac{i_{LOAD}}{2}\right) - i_{CS} \quad (8)$$

$$i_{INVS} - i_{INVS} = 2i_{CS} \quad (9)$$

Figure 6:
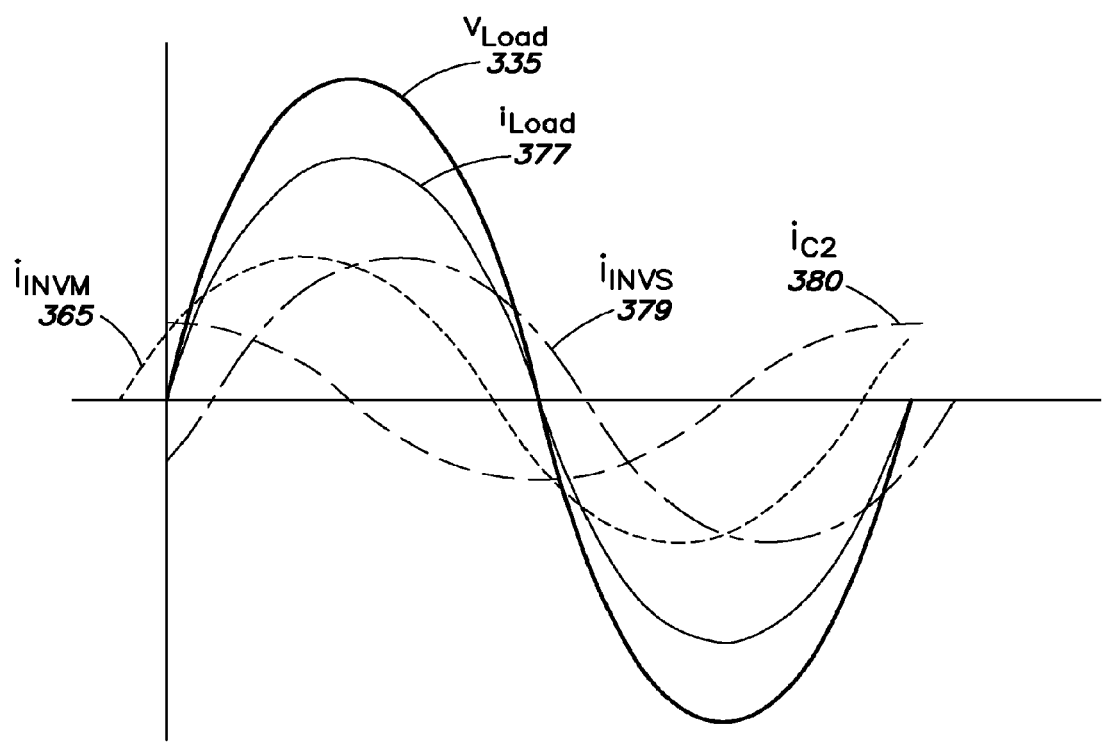
FIG. 6 is a graph illustrating a phase shift in output currents of two uninterruptible power supplies in a parallel configuration in accordance with an embodiment.

In one embodiment, assuming a substantially unity power factor load, slave capacitor current 380 ($i_{CS}$) leads load current 377 ($i_{LOAD}$) by substantially 90 degrees, and there can be a phase difference between master inverter current 365 ($i_{INVM}$) and slave inverter current 379 ($i_{INVS}$), when slave controller 320 does not include capacitor current reference controller 535. This phase shift is illustrated in FIG. 6, which depicts an example phase shift between master inverter current 365 ($i_{INVM}$) and slave inverter current 379 ($i_{INVS}$). As a result of this phase shift, in one embodiment, master inverter 305 and slave inverter 310 may not have equal instantaneous current sharing.

With reference to FIG. 5, in one embodiment, capacitor current reference controller 535 determines reference capacitor current 525, and current sharing between master inverter 305 and slave inverter 310 is substantially equal and instantaneous. In one embodiment, capacitor current reference controller 535 estimates reference capacitor current 525, resulting in substantially equal and instantaneous current sharing between master inverter 305 and slave inverter 310, with some deviation and phase shift introduced due to differences between the estimated reference capacitor current 525 and its actual value.

In one embodiment, when a plurality of uninterruptible power supplies 100 are configured in parallel, each uninterruptible power supply 100, receives an indication of inverter output current from each of the other uninterruptible power supplies 100, as well as an indication of the status of each of the other uninterruptible power supplies 100 as master or slave. Power supplies 100 that are in the master state operate in either inverter or bypass modes of operation, and power supplies 100 that are in the slave state operate in the inverter mode.

In some embodiments, there are a variety of master/slave configurations with a plurality of uninterruptible power supplies connected in parallel. For example, a plurality of uninterruptible power supplies 100 can be in bypass mode at the same time, and each of the plurality is determined to be simultaneously operating in the master state. In another example, at least one uninterruptible power supply 100 is in bypass mode and is the master with the rest operating as slaves in inverter mode. In one embodiment, when all uninterruptible power supplies 100 are in inverter mode one uninterruptible power supply 100 operates as master with the rest operating as slaves. If, in this illustrative embodiment, the master uninterruptible power supply 100 trips (e.g., enters the OFF state), one of the slave uninterruptible power supplies 100 can be reconfigured to operate as a master. Uninterruptible power supplies 100 in the OFF state may be ignored when other uninterruptible power supplies 100 determine their share of the load current.

Figure 7:
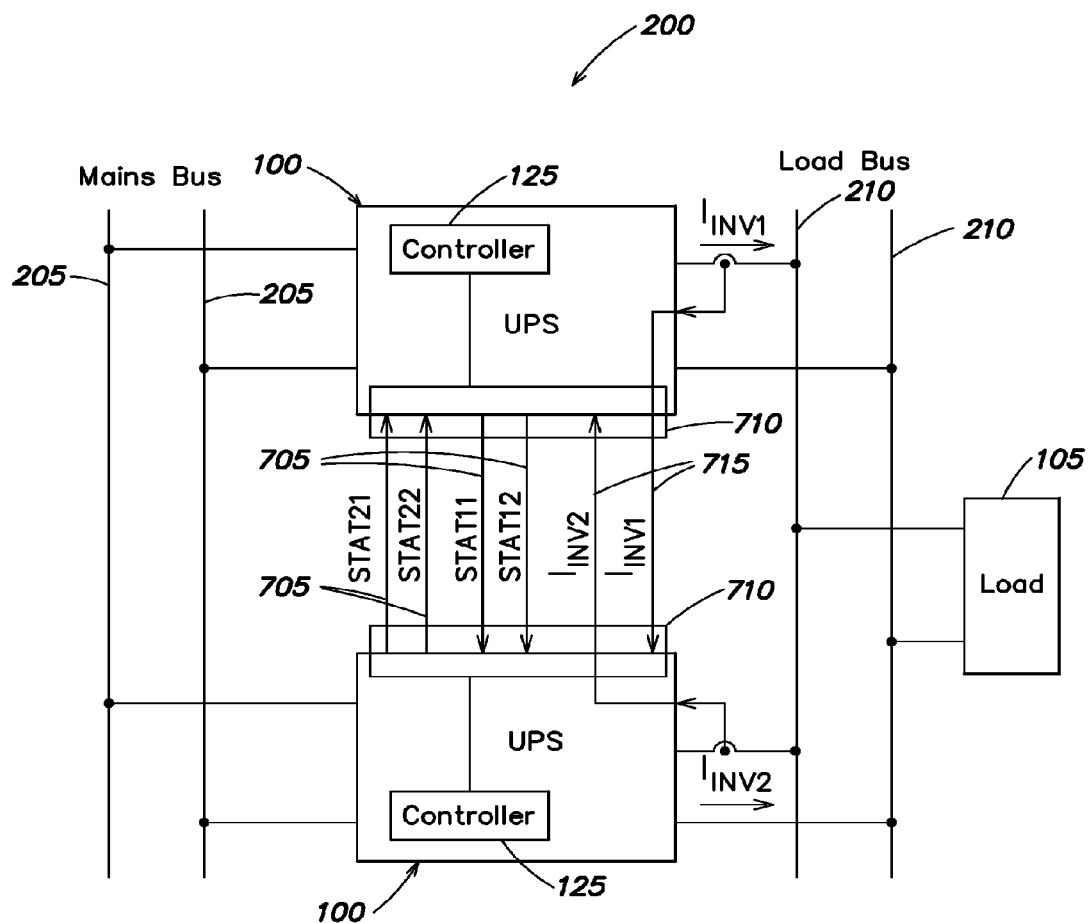
FIG. 7 is a block diagram depicting communication between uninterruptible power supplies in accordance with an embodiment.

In one embodiment, with two uninterruptible power supplies 100 configured in parallel, as in FIGS. 2, 3, and 5, the four states of operation (master-inverter mode; master-bypass mode; slave-inverter mode; and OFF) can be represented by status bits for communication between uninterruptible power supplies as indicated in FIG. 7 and Table 1 below.

TABLE 1

| STATUS BITS (STATx1, STATx2) | STATE |
| --- | --- |
| 00 | OFF |
| 01 | Master - Inverter |
| 10 | Slave - Inverter |
| 11 | Master - Bypass |

FIG. 7 depicts communication between uninterruptible power supplies 100. In one embodiment, uninterruptible power supplies 100 communicate status bit information 705 (STATx1, STATx2) with the other uninterruptible power supplies 100 using communication interface 710 for communications between controllers 125 of uninterruptible power supplies 100. In one embodiment, controllers 125 communicate this status bit information, as well as measured information such as a measured value of master inverter output current 715 to and from uninterruptible power supplies 100 using communication cables 235 (not shown in FIG. 7), or other cables, with controller area network protocols and bus lines. In one embodiment, communication interface 710 includes general purpose input/output (GPIO) connections. Communication interface 710 may also include an isolator such as an opto-isolator isolates the status bit information from each other. Uninterruptible power supplies 100 such as those depicted in FIG. 7 can operate in both master and slave states, and can change between states, so that inverter output current 715 ($i_{INV}$) can be either master inverter current 365 or slave inverter current 379.

A second uninterruptible power supply 100 can be brought online and synchronized with the first uninterruptible power supply 100 that is providing power to load 105. For example, the first uninterruptible power supply 100 supplies power to load 105 as a master, in either inverter or bypass modes of operation, with the second uninterruptible power supply 100 in the OFF state with, for example, inverter circuit breaker 220 in the open position. In this example, the second uninterruptible power supply 100 can receive a command or otherwise determine that it is to turn ON and operate in a line or battery inverter mode. Based, for example, on status bit information 705, the second uninterruptible power supply 100 can determine that it will operate as a slave because the master uninterruptible power supply 100 is in this embodiment operating as the master. The second uninterruptible power supply 100 can then determine if load voltage 335 is within a permissible tolerance range, and operate its inverter initially as a master using load voltage 335 as the reference voltage 340. The second uninterruptible power supply 100 compares its inverter voltage with load voltage 335 and when the difference is less than a threshold amount for a number of consecutive voltage cycles (e.g., two or three), inverter circuit breaker 220 of the second uninterruptible power supply 100 can be commanded to close. In one embodiment there is a delay of 10-20 ms after the command is given for inverter circuit breaker 220 to actually close, which may result in first and second uninterruptible power supplies 100 both operating in the master state for a brief time period, such as 2-3 ms. When, in this embodiment, inverter circuit breaker 220 closes, controller 120 operates the second uninterruptible power supply 100 as a slave with inverter current 379 controlled as described above. In this illustrative embodiment status bit information 705 of the second uninterruptible power supply 100 indicates that is a slave operating in inverter mode, (e.g., status bit information 10 of Table 1 above).

Figure 8:
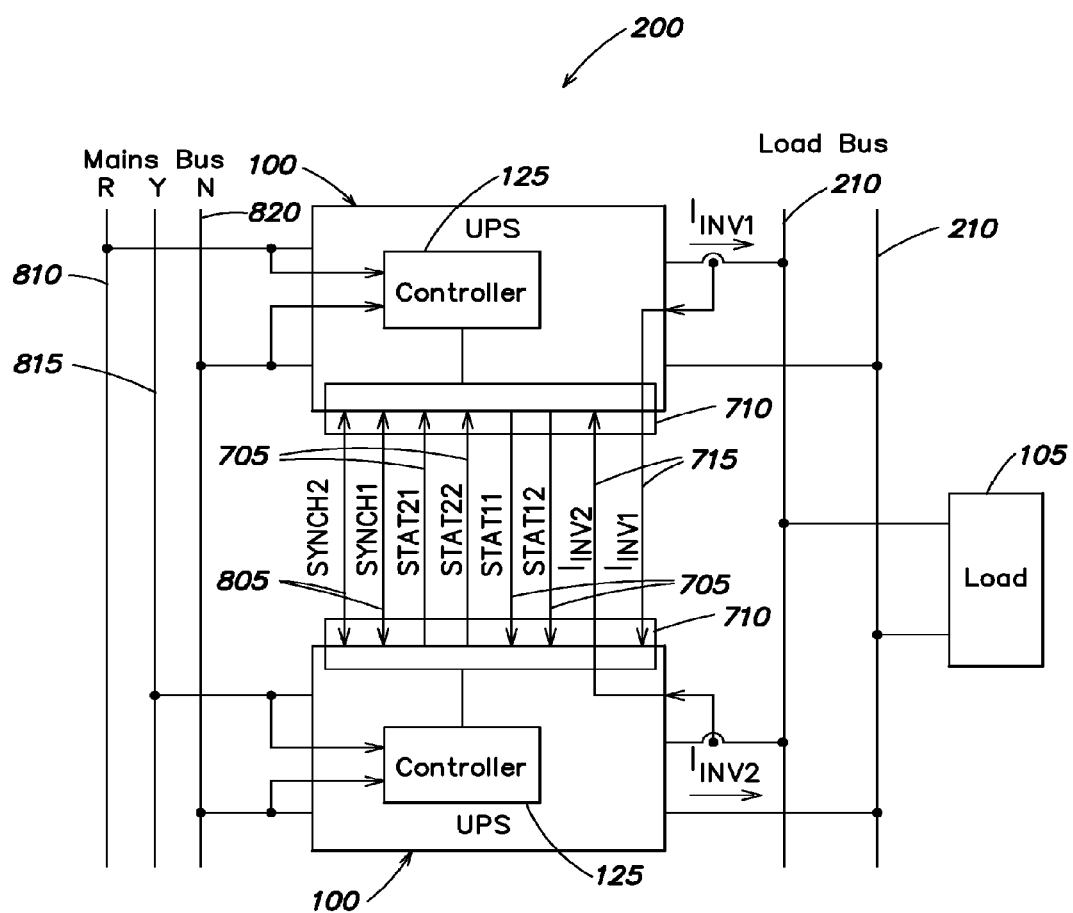
FIG. 8 is a block diagram depicting communication between uninterruptible power supplies in accordance with an embodiment.

FIG. 8 depicts communication between uninterruptible power supplies 100 that includes the sharing of zero crossing information 805 between uninterruptible power supplies. In one embodiment, two uninterruptible power supplies 100 fed from two different input phases are prevented from both operating in the bypass mode to avoid a short circuit between input phases. For example, as depicted in FIG. 8 the first uninterruptible power supply is fed from R-phase 810, and the second uninterruptible power supply is fed from Y-phase 815 with respect to neutral 820. To prevent a short circuit, in one embodiment controllers 125 share zero crossing information 805 via communication interfaces 710. In one embodiment, controller 125 determines that uninterruptible power supplies 100 are in synch, e.g., fed from the same input phase) before controlling uninterruptible power supply 100 to operate in a bypass mode. For example, if two uninterruptible power supplies are fed from different phases, controller 125 can prevent uninterruptible power supply 100 from operating in bypass. It is appreciated that other short circuit situations may arise. For example, a short circuit can occur when the input phases (e.g., R-phase 810 or Y-phase 815) and neutral line 820 are interchanged during installation due, for example to human error. In this example, controller 125 can detect this error based on zero crossing information 805 and can require synchronization before controlling uninterruptible power supply 100 in a bypass mode.

Figure 9:
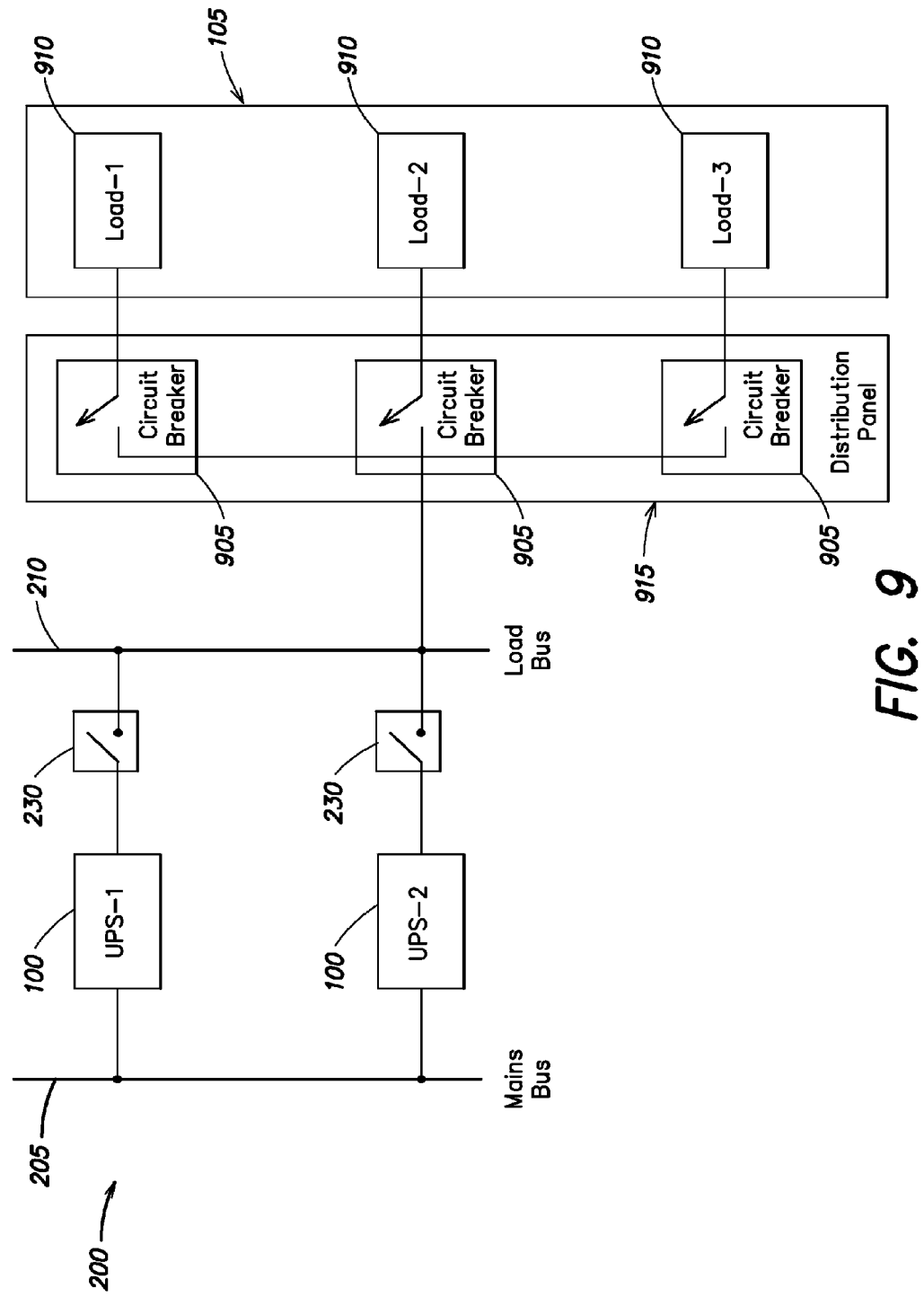
FIG. 9 is a block diagram depicting uninterruptible power supplies connected in parallel with distributed loads in accordance with an embodiment.

FIG. 9 is a block diagram depicting uninterruptible power supplies 100 connected in parallel with distributed load 105. With reference to FIG. 9, circuit breakers 905 can connect load 105 with load bus 210. For example, load 105 can be split into a plurality of load groups 910, with circuit breakers 905 connecting load groups 910 with load bus 210. In one embodiment, circuit breakers 905 are disposed in a distribution panel 915. During, for example, steady state operation of two uninterruptible power supplies 100, each can supply half of the total power to the load bus. These two uninterruptible power supplies 100 may be rated for less than 100% (e.g., 50%) of the total load on load bus 210, and could trip due to overload conditions at startup if one of them becomes the only online uninterruptible power supply 100 connected to load bus 210.

In one embodiment, the uninterruptible power supplies 100 turn ON substantially simultaneously to avoid overload related tripping. With reference to FIG. 9, in some embodiments load 105 is split into load groups 910 via circuit breakers 905. In this example, circuit breakers 905 are OFF during startup of at least one uninterruptible power supply 100, and circuit breakers 905 connect load groups 910 with load bus 210 in sequence after uninterruptible power supply 100 startup to prevent overload.

With reference to FIGS. 9 and 2, in one embodiment at least one output circuit breaker 230 connects uninterruptible power supply 100 with load bus 210. One circuit breaker 230 may open when the associated uninterruptible power supply 100 trips due to overcurrent or human error, disconnecting that uninterruptible power supply 100 from load 105 and disturbing parallel operation. In one embodiment, if the disconnected load 100 is the master, one or more voltage transformers can measure load voltage information, which is communicated to individual uninterruptible power supplies 100. In this embodiment slave state uninterruptible power supplies can use this information to avoid tripping due to output over or under voltage conditions, or to over current conditions.

Figure 10:
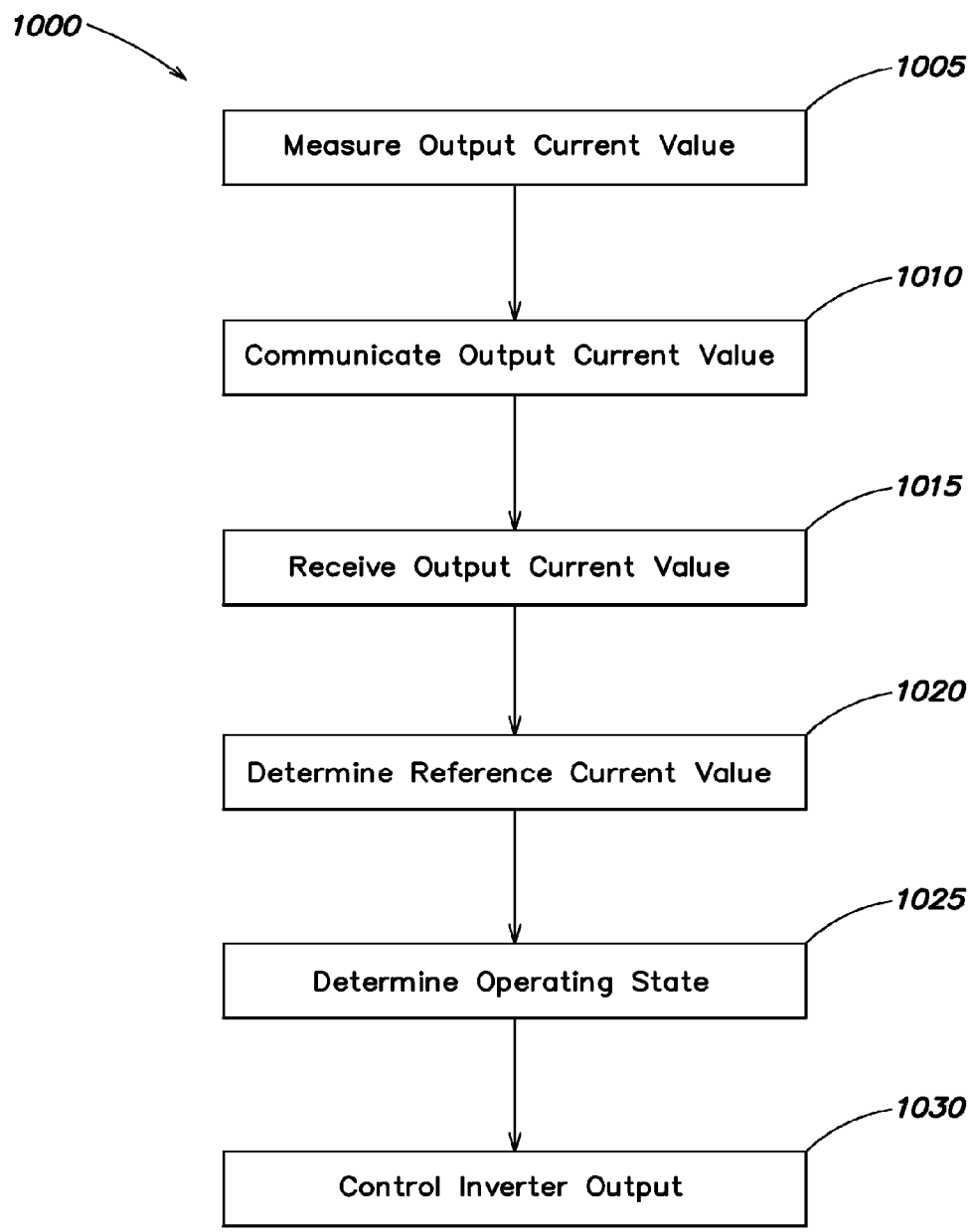
FIG. 10 is a flow chart depicting a method of distributing power to a load using uninterruptible power supplies configured in parallel in accordance with an embodiment.

FIG. 10 is a flow chart depicting a method 1000 of distributing power to a load using uninterruptible power supplies configured in parallel in accordance with an embodiment. The, method 1000 includes an act of measuring output current value (ACT 1005.) For example, at least one current transformer can measure the output current of an uninterruptible power supply. When a plurality of uninterruptible power supplies are configured in parallel, measuring output current (ACT 1005) can include measuring output current with a current transformer that is part of the uninterruptible power supply or located external to the uninterruptible power supply, as part of a paralleling box or as a stand alone device. In one embodiment, measuring the output current value (ACT 1005) includes measuring the load current of a load. In one embodiment, measuring the output current value (ACT 1005) includes measuring the output current of an uninterruptible power supply with a current transformer configured to electrically isolate that uninterruptible power supply from at least one other uninterruptible power supply. In some embodiments, measuring the output current value (ACT 1005) includes estimating inverter output of an uninterruptible power supply.

Method 1000 also includes at least one act of communicating the output current value (ACT 1010). For example, the measured output current value of an uninterruptible power supply or of a load current can be communicated to a plurality of uninterruptible power supplies that are in a parallel configuration to supply power to a load. Communicating the output current value (ACT 1010) may include transmitting and receiving the measured output current value between control logic associated with at least one power supply via at least one communication interface and at least one communication cable. In one embodiment, a plurality of uninterruptible power supplies are configured in parallel and communicating the output current value (ACT 1010) includes communicating at least one of a measured load current and a measured output current value of a corresponding uninterruptible power supply to each of the other uninterruptible power supplies in the parallel configuration. This may but need not include uninterruptible power supplies in an OFF state.

In one embodiment, method 1000 includes an act of receiving the measured output current value (ACT 1015). This may include receiving the measured output value (ACT 1015) such as inverter output current or load current via a communication interface of an uninterruptible power supply. In one embodiment, receiving the measured output current value (ACT 1015) includes receiving an estimate of output current of an uninterruptible power supply. Further, any uninterruptible power supply may receive (ACT 1015) the output current value of any other uninterruptible power supply. In one embodiment, an uninterruptible power supply receives (ACT 1015) the output current value of a plurality of uninterruptible power supplies via at least one communication cable. The measured output current value can also be communicated (ACT 1010) and received (ACT 1015) via wireless communication. This actual inverter output current, in one embodiment, is not a reference or desired output current.

In one embodiment, method 1000 includes an act of determining the reference current value (ACT 1020). This can include determining the reference current value (ACT 1020) of an uninterruptible power supply based at least in part on the measured (ACT 1005) output current value of another uninterruptible power supply or of the load current. For example, when uninterruptible power supplies are configured in parallel, a first uninterruptible power supply can determine the reference current value based at least in part on the measured output current value of at least one other uninterruptible power supply and the number of uninterruptible power supplies that are in the parallel configuration.

Determining the reference current value (ACT 1020) can include identifying the proportion of current that an uninterruptible power supply contributes to the load current. For example, a first uninterruptible power supply can determine a reference current value (ACT 1020) that is substantially equal to the measured output current value of a second uninterruptible power supply.

Method 1000 may also include an act of determining an operating state of the uninterruptible power supply (ACT 1025). This may include determining that an uninterruptible power supply is operating in a master state or a slave state. In one embodiment uninterruptible power supplies determined to be operating in a master state control the output voltage to regulate load voltage and communicate their measured output current value (ACT 1010) to uninterruptible power supplies operating in the slave state. Uninterruptible power supplies determined to be operating in the slave state receive the measured output current value (ACT 1015) and determine their reference current value (ACT 1020) based at least in part on the received output current value from the master uninterruptible power supply.

In one embodiment, method 1000 includes an act of controlling inverter output (ACT 1030). In one embodiment, controlling inverter output (ACT 1030) includes controlling a duty cycle of a pulse width modulation control signal to regulate inverter output current. For example, adjusting the duty cycle can drive the inverter output current of an uninterruptible power supply toward the reference current value. Controlling the inverter output (ACT 1030) can also include controlling inverter output voltage to maintain the load voltage within a desired range, or to drive the load voltage toward a reference voltage level. Controlling inverter output (ACT 1030) may include modulating or adjusting the amplitude, frequency, phase, or intensity of a carrier wave to control the output of an uninterruptible power supply inverter.

Method 1000 provides benefits of precise power supply distribution control of uninterruptible power supplies that are configured in parallel. The method can receive an output current value that was measured and communicated over a communication interface; and can determine a reference current value based at least in part on this received value. At least one uninterruptible power supply may then control its output current based on the reference current value.

Having now described some illustrative embodiments of the invention, it should be apparent to those skilled in the art that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in FIGS. 1 through 10, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both)), non-volatile memory, tape, a system memory, and a computer hard drive.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts, and independent of any intervening solutions, elements, or acts.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, embodiments of the present invention are not limited to the uninterruptible power supplies, and may be used with other power supplies, converters, frequency converters, line conditioners, or other systems generally. The inputs and outputs as described herein may include multiple connections for respectively coupling to a voltage source and a load, and the control systems for uninterruptible power supplies may include more than one controller. The controllers may be analog, digital, or hybrid. Analog to digital converters can convert measured analog signals to digital signals for processing by the controllers. These converters can be part of the controller or separate elements. Further, the nomenclature of master and slave uninterruptible power supplies does not restrict the uninterruptible power supplies to a single operating state. In one embodiment, uninterruptible power supplies are configured to operate as either masters or slaves, and can switch between these two states based, for example, on their modes of operation or the order in which they came online Although some of the Figures illustrate examples of two uninterruptible power supplies configured in parallel, any number of uninterruptible power supplies can be configured in parallel. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An uninterruptible power supply configured to operate in parallel with a second uninterruptible power supply in a power distribution system, the uninterruptible power supply comprising:
   a first inverter configured to provide power to a load;
   a communication interface configured to be coupled to the second uninterruptible power supply via a communication channel, wherein the communication interface is further configured to receive at least one first status signal from the second uninterruptible power supply via the communication channel, the at least one first status signal indicating whether the second uninterruptible power supply is configured to operate in one of a master state or a slave state, the communication interface being configured to provide isolation between the uninterruptible power supply and the second uninterruptible power supply; and
   a controller coupled to the first inverter and the communication interface and configured to control the uninterruptible power supply to operate in one of the master state and the slave state based on the at least one first status signal,
   wherein in the master state, the uninterruptible power supply is configured to control voltage to the load, and in the slave state, the uninterruptible power supply is configured to control an output current value of the first inverter.

2. The uninterruptible power supply of claim 1, wherein the communication interface includes an isolation circuit configured to isolate the uninterruptible power supply from the second uninterruptible power supply.

3. The uninterruptible power supply of claim 2, wherein the isolation circuit includes at least one of an opto-isolator and an opto-coupler.

4. The uninterruptible power supply of claim 1, wherein the at least one first status signal received by the communication interface further indicates whether the second uninterruptible power supply is configured to operate in a bypass mode or an inverter mode, and wherein the controller is further configured to control the uninterruptible power supply to operate in one of the bypass mode or the inverter mode based on the at least one first status signal.

5. The uninterruptible power supply of claim 1, wherein the communication interface is further configured to provide at least one second status signal to the second uninterruptible power supply via the communication channel, the at least one second status signal indicating whether the uninterruptible power supply is configured to operate in the master state or the slave state.

6. The uninterruptible power supply of claim 5, wherein the at least one second status signal further indicates whether the uninterruptible power supply is configured to operate in the bypass mode or the inverter mode.

7. The uninterruptible power supply of claim 1, further comprising a first current sensor coupled to the first inverter and configured to measure the output current value of the first inverter.

8. The uninterruptible power supply of claim 7, wherein the communication interface is further configured to provide the measured output current value of the first inverter from the first current sensor to the second uninterruptible power supply via the communication channel.

9. The uninterruptible power supply of claim 8, wherein the communication interface is further configured to receive a measured output current value of a second inverter from a second current sensor within the second uninterruptible power supply via the communication channel.

10. The uninterruptible power supply of claim 9, wherein in the slave state the uninterruptible power supply is configured to determine a reference output current value based on the measured output current value of the second inverter received from the second uninterruptible power supply and to drive the output current value of the first inverter toward the reference output current value.

11. The uninterruptible power supply of claim 9, wherein the first current sensor is a current transformer configured to measure the output current value of the first inverter, provide the measured output current value of the first inverter to the communication interface, and provide electrical isolation between the uninterruptible power supply and the second uninterruptible power supply.

12. A method of distributing power using an uninterruptible power supply configured to operate in parallel with a second uninterruptible power supply to provide power to a load, comprising:
   receiving, via a communication interface of the uninterruptible power supply, at least one first status signal from the second uninterruptible power supply, the at least one first status signal indicating whether the second uninterruptible power supply is configured to operate in a master state or a slave state of operation;
   isolating, with the communication interface, the uninterruptible power supply from the second uninterruptible power supply;
   controlling the uninterruptible power supply to operate in one of the master state and the slave state based on the at least one first status signal;
   operating, in the master state, the uninterruptible power supply to control voltage to the load; and
   operating, in the slave state, the uninterruptible power supply to control an inverter output current value of the uninterruptible power supply.

13. The method of claim 12, wherein the at least one first status signal received by the communication interface further indicates whether the second uninterruptible power supply is configured to operate in a bypass mode or an inverter mode, and wherein the method further comprises controlling the uninterruptible power supply to operate in one of the bypass mode or the inverter mode based on the at least one first status signal.

14. The method of claim 12, further comprising transmitting, via the communication interface, at least one second status signal to the second uninterruptible power supply, the at least one second status signal indicating whether the uninterruptible power supply is configured to operate in the master state or the slave state of operation.

15. The method of claim 14, wherein the at least one second status signal further indicates whether the uninterruptible power supply is configured to operate in the bypass mode or the inverter mode.

16. The method of claim 12, further comprising measuring an inverter output current value of the uninterruptible power supply.

17. The method of claim 16, further comprising providing the measured inverter output current value of the uninterruptible power supply to the second uninterruptible power supply via the communication interface.

18. The method of claim 12, further comprising receiving a measured inverter output current value of the second uninterruptible power supply via the communication interface.

19. The method of claim 18, further comprising:
   determining a reference current value of the uninterruptible power supply based on the measured inverter output current value of the second uninterruptible power supply; and
   controlling a duty cycle of a pulse width modulation control signal to drive an inverter output current of the uninterruptible power supply toward the reference current value.

20. An uninterruptible power supply configured to operate in parallel with a second uninterruptible power supply to provide power to a load, the uninterruptible power supply comprising:
   an input configured to receive input power;
   an inverter configured to provide output power to a load; and
   means for electrically isolating the uninterruptible power supply from the second uninterruptible power supply and for operating the uninterruptible power supply in one of a master state and a slave state;
   wherein in the master state, the uninterruptible power supply is configured to control voltage to the load, and in the slave state, the uninterruptible power supply is configured to control an output current value of the inverter.

* * * * *